United States Patent

Conquest et al.

[11] Patent Number: 4,571,662
[45] Date of Patent: Feb. 18, 1986

[54] LEADLESS CAPACITORS

[75] Inventors: Alexander R. Conquest, Epping Green; Christopher F. Powling, Paignton, both of England

[73] Assignee: Standard Telephones and Cables plc, London, England

[21] Appl. No.: 618,750

[22] Filed: Jun. 8, 1984

[30] Foreign Application Priority Data

Jun. 17, 1983 [GB] United Kingdom ............... 8316554

[51] Int. Cl.⁴ ..................... H01G 9/00; H01G 1/14; H01G 7/00
[52] U.S. Cl. ................................ 361/306; 29/25.42; 361/433
[58] Field of Search ................... 357/69, 72, 74; 361/433, 306, 307, 308, 310; 29/25.42

[56] References Cited

U.S. PATENT DOCUMENTS

| | | | |
|---|---|---|---|
| 3,550,228 | 12/1970 | Asscher | 361/306 X |
| 3,588,628 | 6/1971 | Peck | 317/238 |
| 3,997,821 | 12/1976 | Sternbeck | 361/433 |
| 4,158,218 | 6/1979 | McLaurin et al. | 361/306 X |
| 4,247,883 | 1/1981 | Thompson et al. | 361/306 X |
| 4,417,298 | 11/1983 | Nakata et al. | 357/72 X |
| 4,497,105 | 2/1985 | Uemura | 29/25.42 X |
| 4,510,554 | 4/1985 | Irikura | 361/433 |

FOREIGN PATENT DOCUMENTS

WO82/02978 9/1982 PCT Int'l Appl. .
1212899 11/1970 United Kingdom .
1309411 3/1973 United Kingdom .

*Primary Examiner*—Donald A. Griffin
*Attorney, Agent, or Firm*—Kerkam, Stowell, Kondracki & Clarke

[57] ABSTRACT

Lead-less tantalum capacitors are made using a lead frame (1) formed to provide connection terminals (3,4) separated by an H-shaped aperture (7) and a bent-up anode support station (5). A two-part mould (13,13a) is used to injection mould plastics around the capacitor bodies prior to detaching the capacitors from the lead frame by severing necks (15,16,17,18).

A second embodiment has flat connection terminals which are bent around the encapsulated body.

6 Claims, 24 Drawing Figures

LEADLESS CAPACITORS

This invention relates to capacitors particularly to such capacitors of the lead-less or face-bonding kind to facilitate easy connection to a printed circuit board.

An electrolytic capacitor having a solid electrolyte may be produced by first preparing a porous anode by forming a coherent body of sintered particles of a film-forming metal, for example tantalum. A dielectric oxide of tantalum is then formed on the outer surfaces of the sintered body, as well as the internal surfaces of the pores. The body is then impregnated with a semi-conductive material, such as by an impregnation of a manganous salt in liquid form into the interstices of the porous body and subsequently converting the manganous salt to manganese dioxide by pyrolytic decomposition. A succession of impregnations and decompositions results in a final product having the manganese dioxide filling the spaces between the particles and also disposed on the outside of the body so as to form an overlying coat.

The capacitor is completed by applying a cathode layer thereon and, if desired, suitably encasing the unit. An electrically conductive coating of carbon particles is deposited on the solid electrolyte, such as by dipping into an aqueous suspension of graphite. This coating is heat dried to drive off moisture, and serves to provide a low resistance contact to the manganese dioxide coating, thereby lowering the equivalent series resistance of the tantalum anode. It is known to then apply an intermediate coating of silver paint over the carbon to provide a solderably surface for the unit, and to complete the counter-electrode by applying solder over the silver coating.

Various manufacturing techniques have been proposed for lead-less capacitors. An early example is disclosed in British Patent Specification No. 1 212 899 in which the capacitor body with its electrodes attached is inserted into a preformed plastics cap and subsequently filled with an epoxy resin to fully encapsulate the capacitor. This however leads to a relatively bulky product and does not fully meet the present-day needs for micro-miniaturisation because there is inefficient use of the available volume. UK Patent Specification No. 1 309 411 shows an arrangement in which a specially shaped strain absorbing portion is provided on the anode connection terminal to minimise the strain applied to the tantalum anode wire. This however coupled with the flat-feet approach for the connection terminal in assembly techniques described, once again requires a relatively large amount of wasted volume taken up by the encapsulating material. This is particularly clear from FIG. 4 in which it can be seen that only a relatively small portion of the overall volume is in fact taken up by the capacitor body. PCT patent application WO 82/02978 describes another arrangement using a lead frame assembly technique and resin encapsulation but requires a relatively complicated bent configuration for the connection terminals and once again is not very efficient in the use of the space available.

An object of the present invention is to provide a lead-less solid electrolytic capacitor which can be made using a lead frame technique to enable a high degree of automation yet which makes highly efficient use of the overall volume occupied, and overcomes other manufacturing problems.

According to the present invention there is provided a method of making a solid electrolytic lead-less capacitor comprising providing a lead frame of thin metal, having at each of a plurality of locations anode and cathode connection terminals, locating a solid electrolytic capacitor body on the terminals and connecting the capacitor body electrodes to respective terminals, moulding an insulating material around the body to form an encapsulated capacitor with outer surfaces of the terminals exposed, and subsequently severing the encapsulated capacitor from the lead frame.

According to another aspect of the present invention there is provided a solid electrolytic lead-less capacitor comprising a capacitor body having an anode wire projecting therefrom and a cathode connection area on the surface of the body remote from the anode wire; a cathode connection terminal of bent flat metal strip and having one limb connected to the cathode connection area; an anode connection terminal of bent flat metal strip and having the end of one limb connected to the anode wire. The capacitor body, anode wire and respective one limbs of the connection terminals being encapsulated in insulating material; the remaining portions of the terminals conforming generally to the external configuration of the encapsulating material and the exposed limbs forming external connection pads for connecting the capacitor to an electrical circuit.

According to a further aspect of the present invention there is provided a method of making a lead-less solid electrolytic capacitor comprising providing a lead frame of thin metal having at each location along its length, an anode connection terminal having a bent-up part and connected to the lead frame by at least one neck located intermediate the ends of the terminal, and a cathode connection terminal connected to the lead frame by at least one neck located intermediate the ends of the terminal, providing a solid electrolytic capacitor body with an anode wire projecting therefrom and a cathode connection area on the body, welding the anode wire to the bent-up part and connecting the cathode connection area to the cathode connection terminal, encapsulating the body, the anode wire and portions of the anode and cathode connection terminal adjacent the body, and subsequently separating the encapsulated body from the lead frame by severing at least one of the connection webs.

In order that the present invention can be clearly understood reference will now be made to the accompanying drawings in which:

FIG. 6 shows the capacitor assembly of FIG. 4 after the moulding step; and

Figure 1:
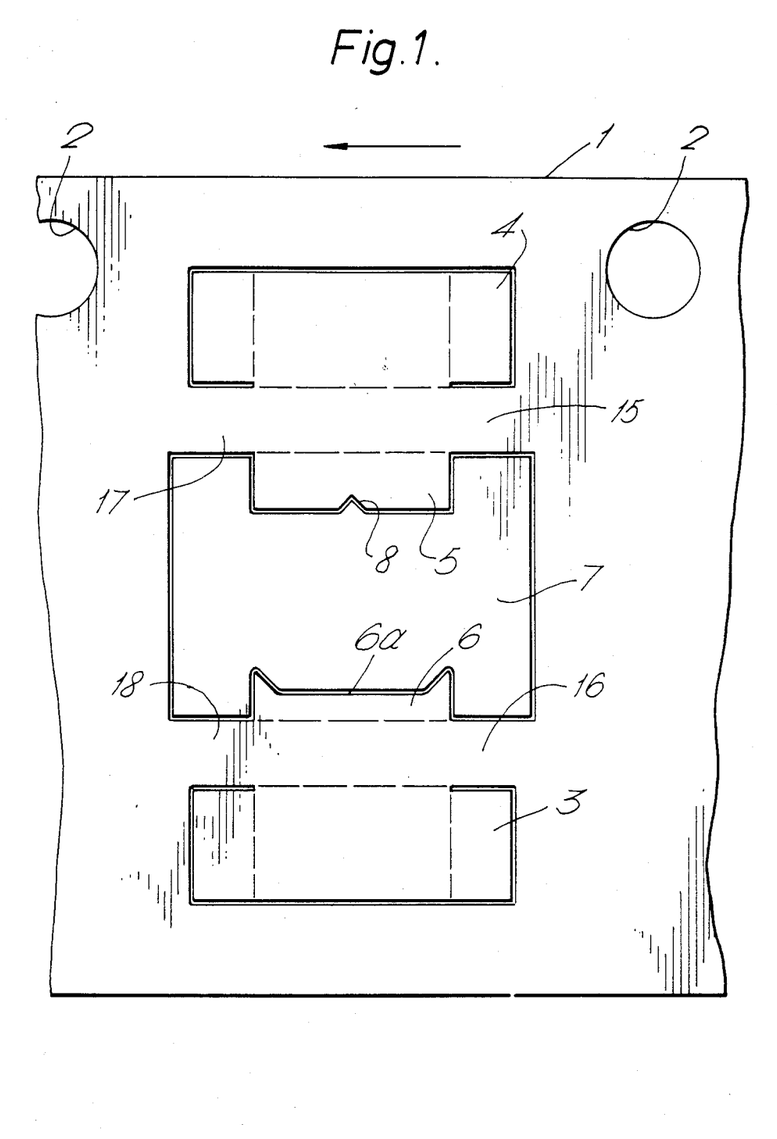
FIG. 1 shows in plan view the outline of part of an etched lead frame for use in manufacturing capacitors in accordance with an embodiment of the present invention.

Referring firstly to FIG. 1 of the drawings there is shown in perspective the formation of the lead frame from a strip 1 having a thickness of about 0.003 inches and, in this embodiment, made from thin sheet metal and etched to create indexing holdes such as 2, cathode connection terminal 3, anode connection terminal 4, anode wire support station 5, and cathode support station 6. The large H-shaped region 7 is removed from the strip to leave an H-shaped aperture.

The thin metal sheet thickness could lie in the range 0.002 inches to 0.004 inches. The material can be brass, phosphor-bronze, stainless steel, copper, beryllium copper, or possibly mild steel. However, brass is especially suitable because it is springy, easily solderable and non-magnetic.

Figure 2:
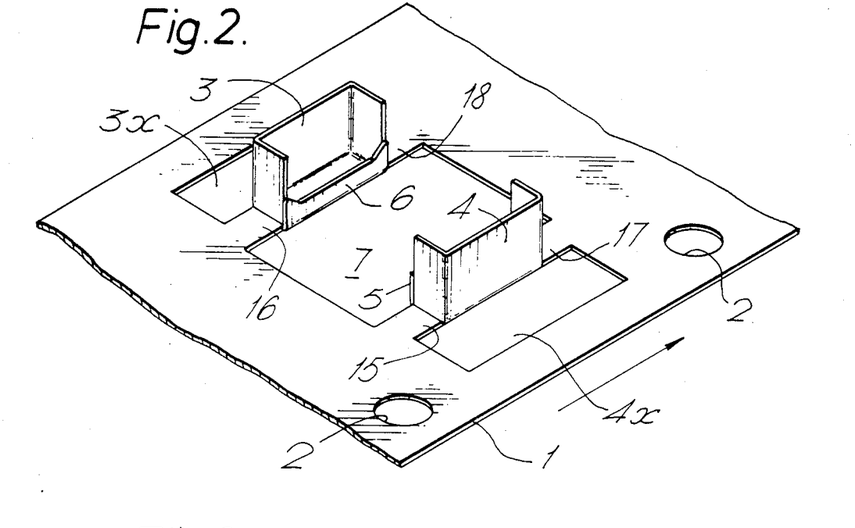
FIG. 2 shows the part of the strip of FIG. 1 in its formed-up condition.

The lead frame so formed is tinned by a conventional process and is fed by the indexing holes to a forming station to form up and bend parts 3,4,5 and 6 of the lead frame. Parts 3 and 4 are bent to form box-like connection terminals to accommodate the cathode and anode respectively. This is shown in perspective view in FIG. 2 of the drawings. The anode wire support station 5 has a V-shaped notch 8 in which the anode wire of the capacitor body is located. The forming to shape is done with a press tool and the continuous strip is formed by passing it in a step-wise manner through a progression tool on a power press. Thus for each capacitor there is provided a first outer aperture 4x from which the box-like anode connection terminal 4 has been bent up, a second outer aperture 3x from which the box-like cathode connection terminal 3 has been bent up, and an in-between aperture 7 from which an anode support station 5 has been bent up and from which a cathode support station 6 has been bent up as shown in this embodiment. The cathode support station has a centralising recess 6a to assist in centralising the capacitor body in the box 3 during assembly.

Figures 2A, 2B:
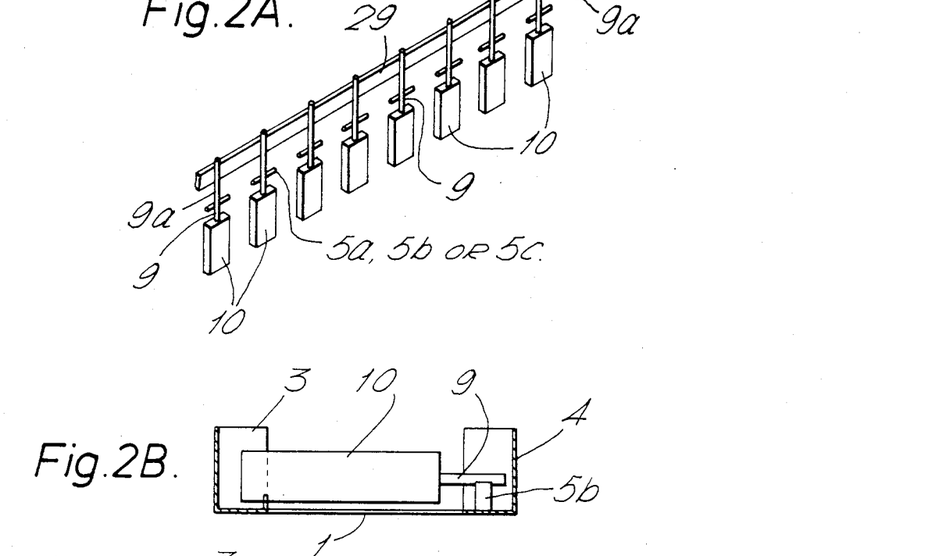
FIGS. 2A to 2E show alternative arrangements for the anode wire support station.

The capacitor anodes made as described in the preamble arrive on a suitably pitched carrier strip 29, FIG. 2A with their stub wires necked as shown at 9a, FIG. 2B. At the cathode end they are lowered into a conducting paste, such as a silver paste, and the anode stub wire is connected to the lead frame via the anode support station before the neck is broken to release the carrier strip.

Figure 3:
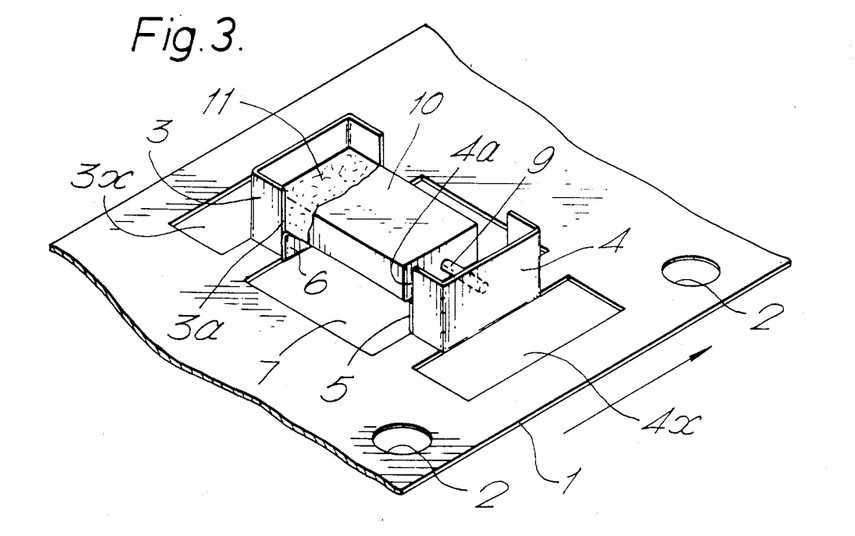
FIG. 3 shows the part of FIGS. 1 and 2 with a capacitor body secured therein.

The conducting paste is baked to bond and electrically connect the cathode of the capacitor body to the cathode connection terminal 3 and the cathode rests on the edge of the recess 6a of the cathode support station 6. At the other end the anode wire 9 is located in the V-shaped notch 8 and is welded into that notch. This is shown in FIG. 3.

We have discovered that the use of a relatively thin strip material for the lead frame, as mentioned above of the order of 0.003 inches, in itself provides any strain relief necessary to ensure that the anode wire is not damaged during the assembly process.

It is proposed to carry out a continuous manufacturing process from the point where the capacitor bodies are located in the lead frame to the point where the complete capacitors are severed from the lead frame with the moulded encapsulating material. However, where silver paste is used to make both cathode and anode connections the lead frame is handled in a part-continuous process using silver paste and then bake the capacitor assemblies to complete the silver paste joints on assemblies on discrete strips of lead frame. These discrete strips are subsequently fed through the moulding stage in the batch-wise and step-wise process described above.

As an alternative to using conductive paste such as silver paste, the connections can be made with a high melting point solder so that a continuous step-wise process can more easily be achieved because there is no baking step required. In this embodiment the connection terminals 3 and 4 would already have a "bump" of solder on them. The capacitor body would be placed in position in the lead frame and the frame with the bodies in place would be passed through a re-heating station to reflow the solder to form the connections between the cathode and the cathode connection terminal 3 and the anode and anode connection terminal 4.

Instead of forming the anode support station from the lead frame, it is possible in alternative embodiments to form the anode support station partly or completely from a cross-tree which is pre-welded to the anode wires while they are still supported on the carrier strip 29. This is illustrated in FIG. 2a.

Another embodiment is shown in FIG. 2B in which the cross-tree 5b extends the whole distance between the anode wire 9 and the surface of the lead frame 1 and is joined to the lead frame in the bottom of the anode connection terminal 4 using either high melting point solder e.g. 300 C., or silver paste.

Figure 2C:
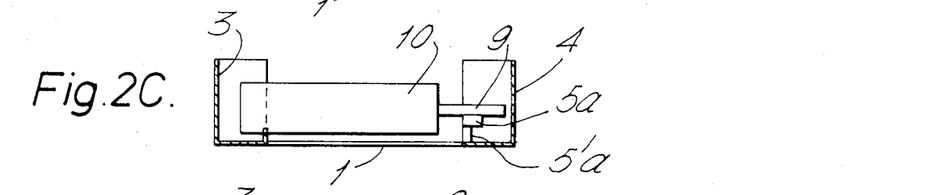

Another embodiment is shown in FIG. 2C where the anode wire connection is again modified. Here there is a bent-up part 5'a of the anode support station 5, the remaining part being provided by the cross-tree 5a. Parts 5a and 5'a are either soldered together using high melting point solder or joined using silver paste.

Figure 2D:
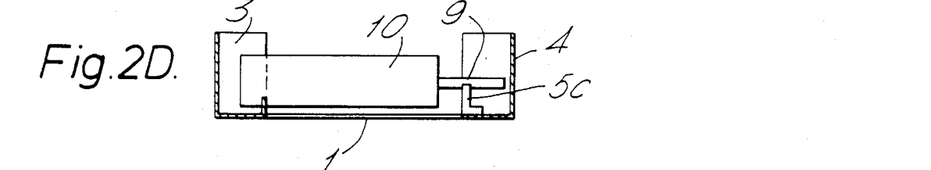
Figure 2E:
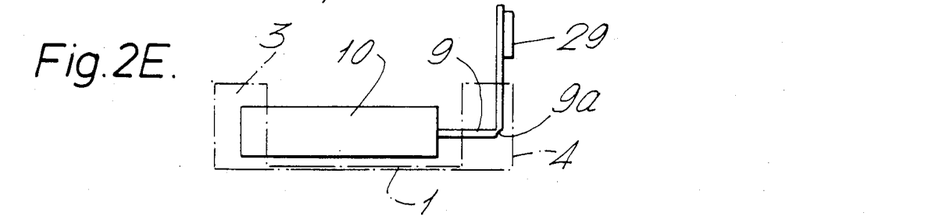

Another embodiment is shown in FIG. 2D in which an anode wire cross-tree 5c is shown having an L-shaped cross section and forming the anode wire support station 5. The lower foot of the L-shaped cross-tree is connected to the bottom of the anode connection terminal 4 either by solder or by a silver paste.

The cross-tree 5a,5b or 5c can be made of a magnetic material such as nickel to provide a magnetic indication of polarity.

The nickel cross-tree 5a,5b or 5c is welded initially as one long strip (FIG. 2A) to all the anode wires using laser, resistance or friction welding techniques and is subsequently cropped to produce the individual cross-trees on each anode wire. The cross-tree has a length which just fits in the box-like anode connection terminal so that in conjunction with the recess 6a, the capacitor body is accurately centralised in the connection terminals. In the embodiment using the notch 8 this notch provides a similar centralising function.

Figure 4:
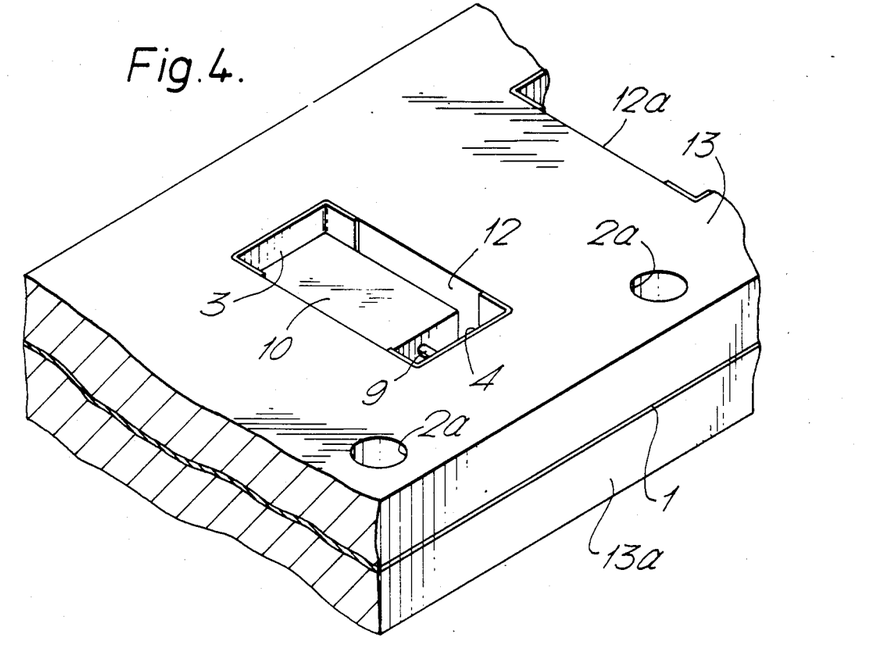
FIG. 4 shows the moulding step in the manufacturing process.

When the connections have been made the strip has a number of capacitor bodies secured to it forming individual capacitor assemblies linked by the lead frame, and the strip is then passed (by this time the remainders of the stub wires have been broken away at the necked portions) and the capacitor assemblies are then fed into individual recesses in two-part moulds into which an insulating resin is placed. One example is shown in FIG. 4, where the anode assembly is a snug-fit in the recess 12 of the moulding block part 13. Underneath is a second moulding block part 13a and the two parts are squeezed together with the lead frame 1 clamped between them.

This mould is made of silicon rubber which has the great advantage that it is resilient to the extent that the side faces of the mould recess will closely embrace the anode and cathode connection terminals secured thereto, themselves resilient, so that resin applied to the mould will be prevented from reaching the external connection surfaces of the connection terminals 3 and 4.

The mould has a group of recesses such as 12 (another is partially shown at 12a) so that the lead frame carrying the capacitor assemblies can have a group of the assemblies encapsulated at the same time. An indexing hole 2A corresponding to the indexing hold 2 shown in earlier figures is used to enable indexing of the strip 1 and mould block parts 13 and 13a. There would be a stepwise movement of a batch of twenty assemblies at once, located into twenty moulding recesses in the mould. This mould is advanced with the strip until the resin has set and once removed is returned to a position upstream to receive another twenty assemblies. There would be several such blocks for use together at any one time.

Figure 5:
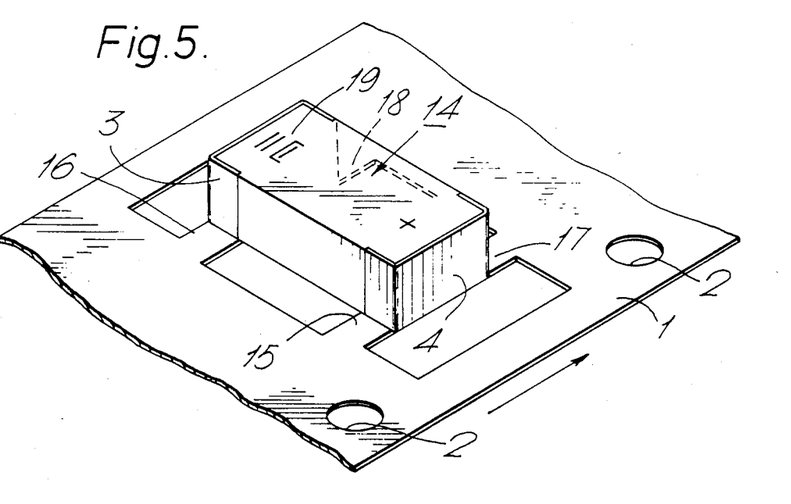

The resin is relatively quick setting and the mould block parts 13 and 13a are removed from the lead frame 1 so that the individual capacitor assemblies encapsulated in resin as indicated by reference numeral 14, are still attached to the lead frame 1 by means of neck portions 15,16,17 and 18. The lead frame is then fed through a coding station at which the individual components are coded by a marking applied to the top face of the body 14—these markings are indicated by reference numerals 19 and 20.

Figure 6:
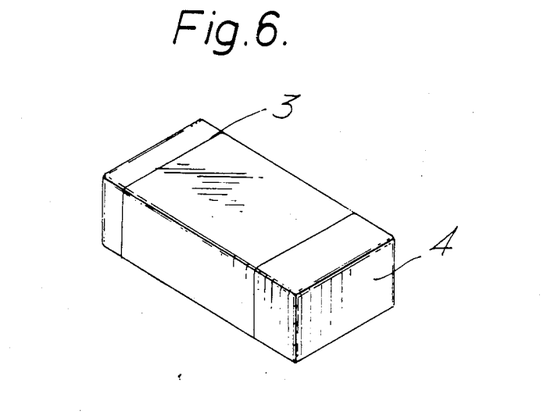
FIGS. 6 and 7 show respectively an underneath view and a top view of the finished capacitor.
Figure 7:
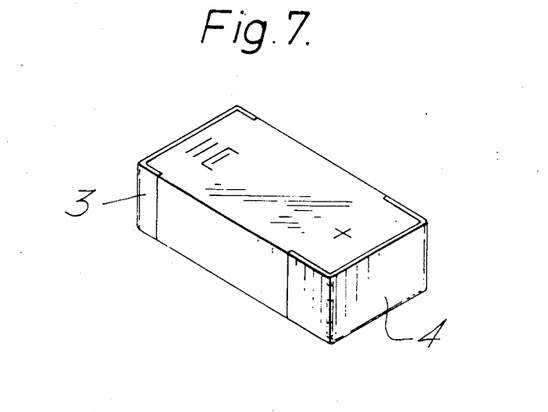

Finally the capacitors are severed from the lead frame 1 by severing the neck portions 15 to 18 inclusive at a severing station and the finished component, illustrated in its underneath view in FIG. 6 and in its top view in FIG. 7, are completed.

As can be seen in FIG. 6 the box-like anode and cathode connection terminals 3 and 4 extend around three sides of the component and are also existing at the end faces of the component.

The overall length of the capacitor body and the anode stub wire is greater than the distance between the inner edges 3a and 4a of the cathode and anode terminals as depicted in FIG. 3.

As an alternative, an injection moulding can be carried out in the moulds 13,13a using a thermoplastic material. This has the advantage of high speed production and provided it has a high enough melting point e.g. 300 C., then it will be satisfactory during any subsequent normal soldering operation to solder the capacitor to a printed circuit board.

As can be seen from the FIGS. 2B to 2E the anode and cathode support stations are so constructed and arranged as to centralise the wire 9 and body 10 in respectively the anode and cathode terminals, both laterally and with respect to the top and bottom surfaces thereof.

The capacitor described will be relatively small having a length in the range 3 mm to 8 mm, a width in the range of 1.5 mm to 4 mm and a depth in the range 1 mm to 4 mm, depending on size of capacitance to be provided. The anode terminal external connection surface on the underneath face will normally be larger than the corresponding cathode area, being approximately twice the size in the lengthwise direction of the capacitor (see FIGS. 6 and 7).

Figure 8:
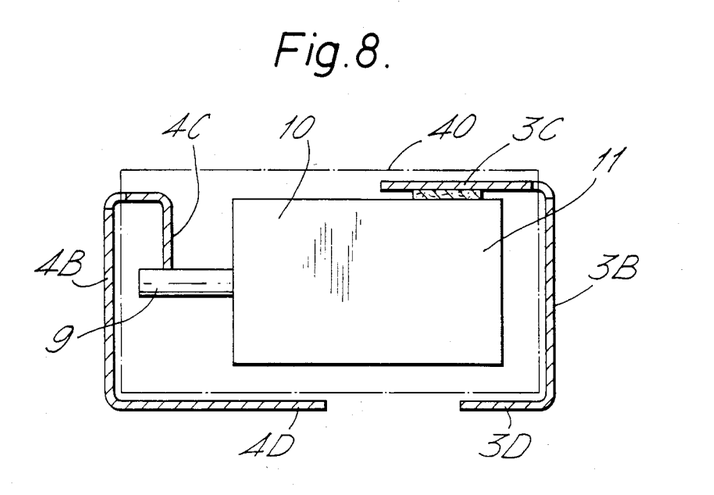
FIG. 8 shows in cross section and somewhat schematically a solid electrolytic leadless capacitor according to another embodiment of the present invention.
Figure 9:
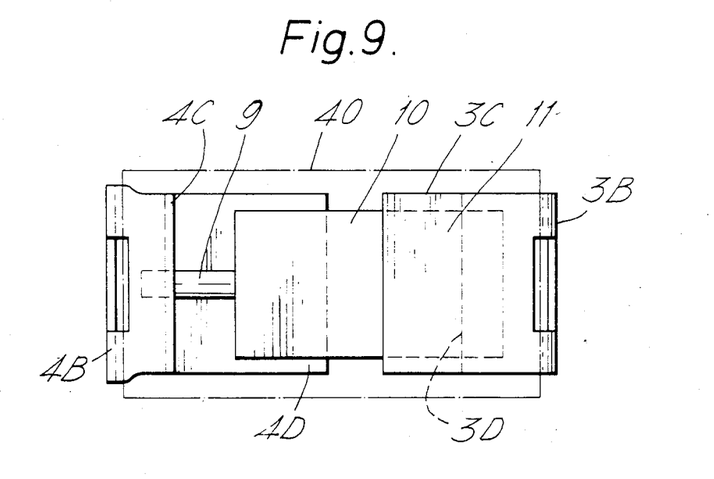
FIG. 9 shows a plan view of the capacitor of FIG. 8

Referring now to FIGS. 8 to 11 there is shown another embodiment of the invention using an alternative lead-frame configuration. Referring to FIGS. 8 and 9 the capacitor body 10 is the same as that described with reference to the earlier Figures and has an anode wire 9 projecting therefrom and a cathode connection area 11. In this embodiment a cathode connection terminal 3B is of generally U-shaped cross-section having a limb 3C connected to the cathode area 11, and the anode connection terminal 4B is of generally L-shaped cross-section with one end 4C bent up and welded to the anode wire 9.

Unlike the earlier embodiment the connection terminals 3b and 4b are not of box-like configuration and correction to a printed circuit board or other electrical circuit is made solely through the anode and cathode connection pads 4D and 3D respectively.

In common with the earlier embodiment, the cathode and anode connections to the capacitor body and anode wire are made while the anode and cathode terminals are still part of or connected to a lead frame and, similar to the earlier embodiment, the capacitor body and anode wire and portions of the cathode and anode connection terminals adjacent to the capacitor body, are encapsulated in insulating material, such as insulating resin, by an injection moulding process, while the capacitor bodies and connection terminals are still fixed to the lead frame. Only after encapsulation are the capacitors severed from the lead frame by severing necks which still connect the capacitor to the lead frame.

Figure 10:
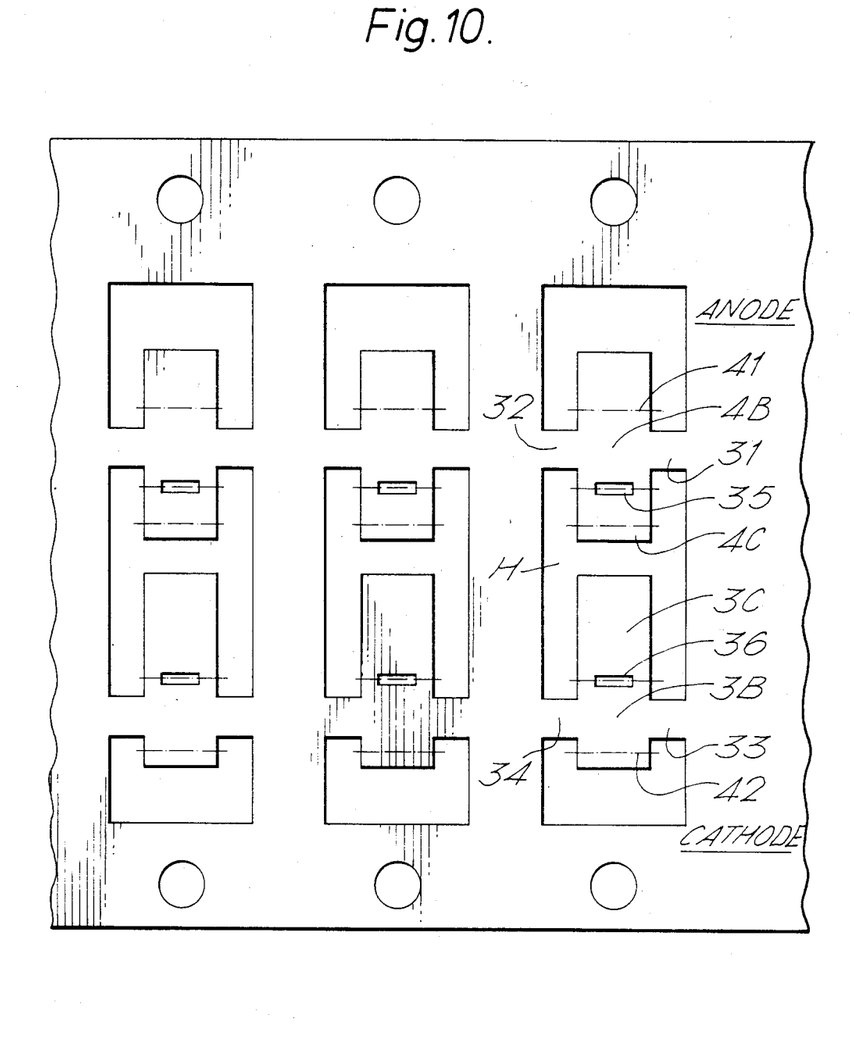
FIG. 10 shows the lead frame for making the capacitor of FIGS. 8 and 9.

Referring now to FIG. 10 the lead frame configuration is shown therein and has a thickness of six thou. At each location there is an anode connection terminal 4B and a cathode connection terminal 3B. Each terminal is connected to the lead frame by respective necks 31,32,33 and 34 and each terminal has a weakening aperture 35 and 36, respectively, to facilitate bending of the terminals at a later stage in the manufacturing process. The parts 4C,4D and 3C,3D of the terminals are identified, and the horizontal dashed lines e.g. 41 and 42 indicate positions at which the terminals will be bent during the following steps of manufacture.

As with the earlier embodiment (see reference numeral 7), a generally H-shaped recess is defined by the lead frame configuration, separating the anode and cathode connection terminals.

There will now be described the step-by-step account of the manufacturing process using the lead frame of FIG. 10.

Figures 11A, 11B, 11C:
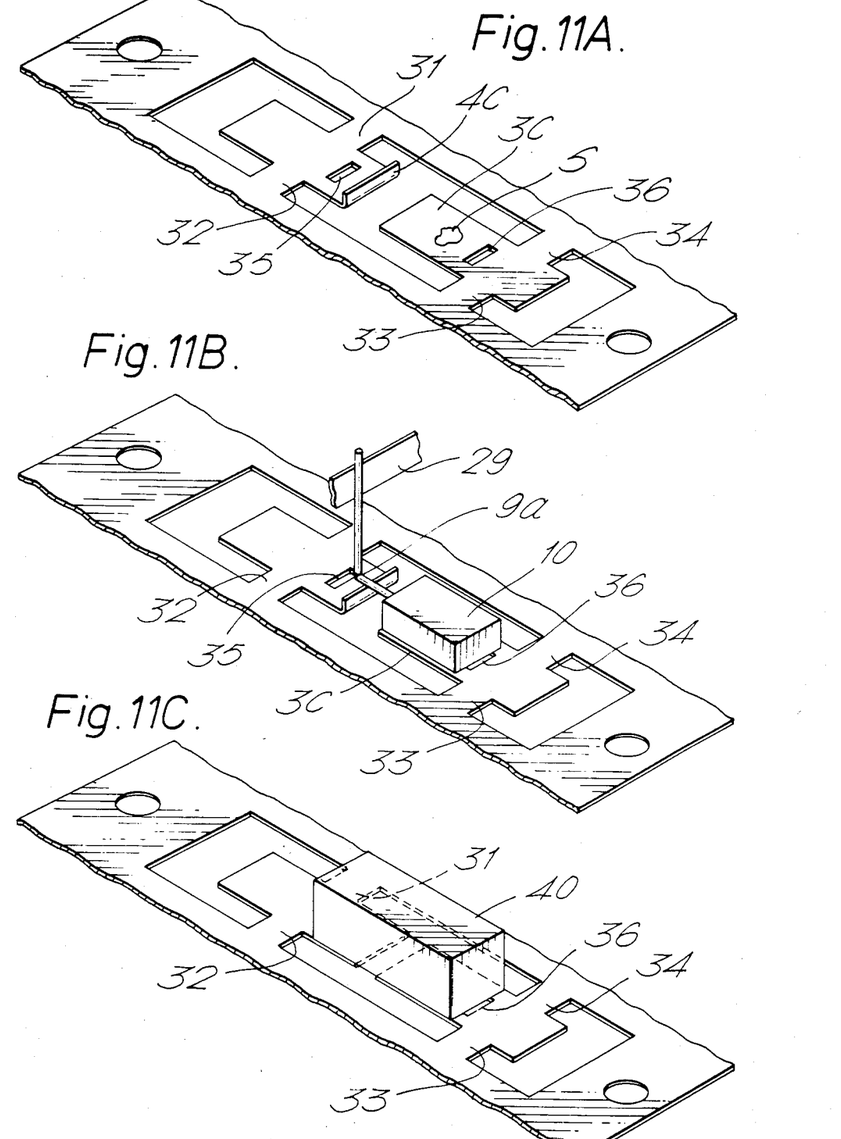
FIGS. 11A to 11I show various steps in the manufacture of the capacitor of FIGS. 8 and 9

Referring to FIG. 11A there is shown the lead frame of FIG. 10 and the first stage in the process is to bend up from the lead frame the anode support station 4C, corresponding to part 5 of FIG. 1.

FIG. 11B shows the introduction of the capacitor body 10 supported, as with the previous embodiment, from a suitably pitched carrier strip 29 with the stub wires necked as shown at 9a, and the anode wire 9 is welded to the support station 4C and the cathode body 10 is soldered to the cathode terminal 3C by a vapour phase soldering technique. A bump of the solder S is shown in FIG. 11a.

Referring to FIG. 11C, after the neck 9a of FIG. 11B has been broken, the capacitor body, anode wire, and portions of the anode and cathode connection terminals 3C and 4C, are encapsulated by an injection moulding technique in which the two mould halves are bought up against the top and bottom respectively of the lead frame to define a moulding cavity around the capacitor body and its connection terminals. This encapsulated body is indicated by reference numeral 40. The encapsulation just extends to the weakening slots 35 and 36.

Some flash extends into the H-shaped recess and this is subsequently removed.

Figure 11D:
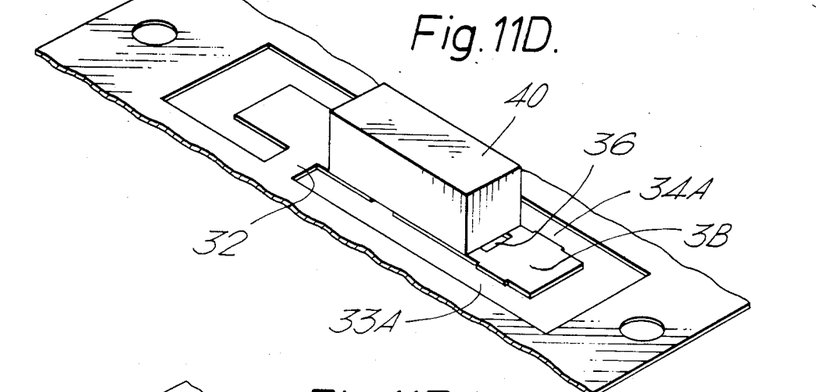

The next step is illustrated in FIG. 11D in which the necks 33 and 34 are removed by a cropping operation, leaving gaps 33A and 34A so that the cathode connection terminal 3B is now supported by the encapsulated capacitor body 40 from the necks 32 and 31.

Figures 11E, 11F:
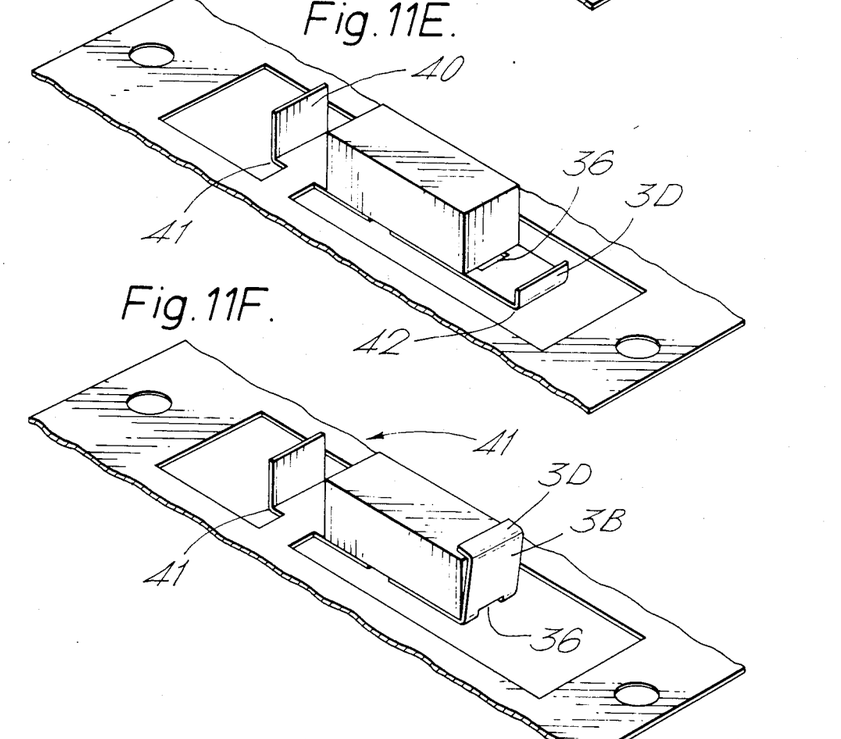

Referring now to FIG. 11E the next stage is to bend up the anode and cathode connection tabs 4D and 3D, respectively. These tabs are bent along lines indicated schematically in FIG. 10 by reference numerals 41 and 42. As an alternative the cropping operation to remove the connection necks 33 and 34 can be done simultaneously with the formation of the cathode connection pad 3D.

The next operation is illustrated in FIG. 11F in which the cathode connection terminal 3B is bent up around the edge of the encapsulated capacitor where the weakening aperture 36 facilitates bending along that axis.

Figures 11G, 11H:
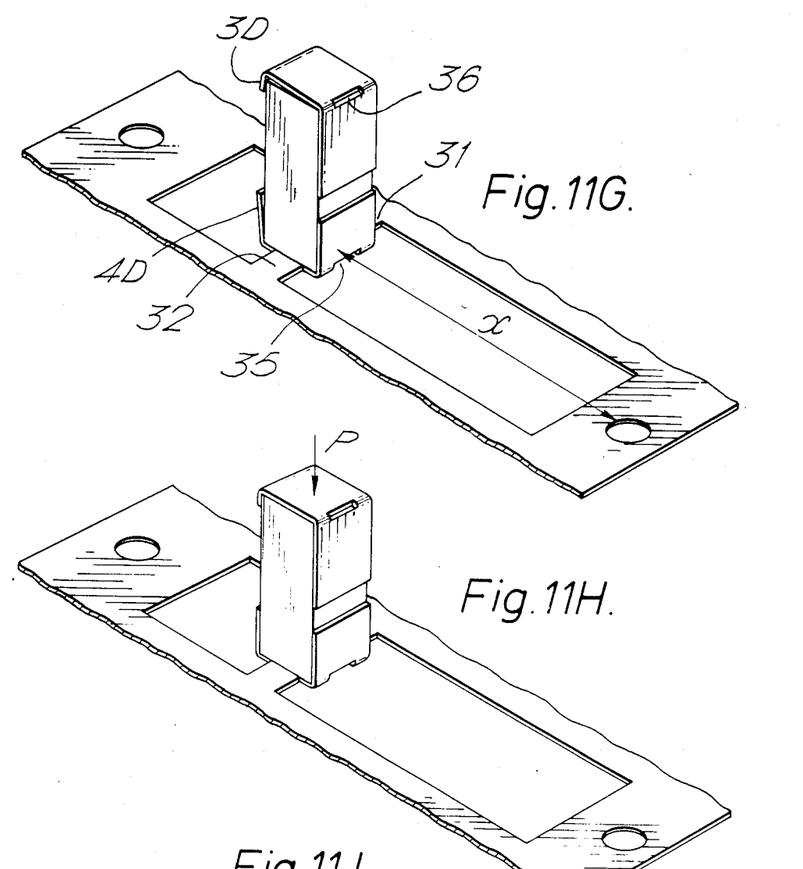
Figure 11I:
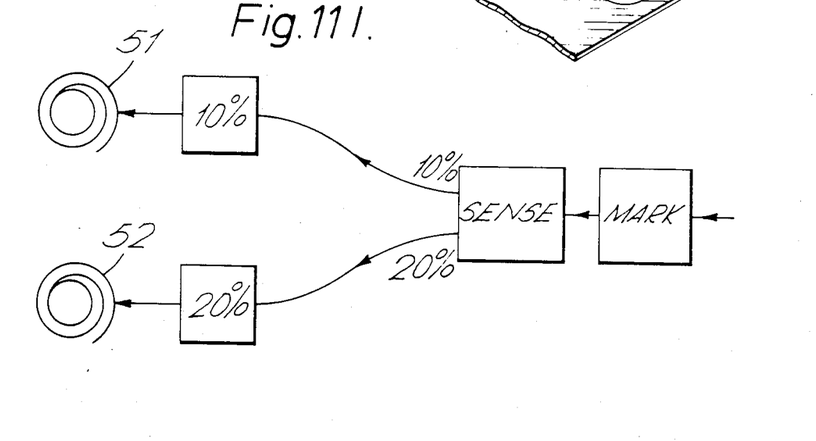

The next operation is shown in FIG. 11G where the capacitor body is bent up about the edge of the encapsulated capacitor where, once again, a weakening aperture 35 facilitates bending. At this stage the capacitor is complete except for its connection still to the lead frame via the necks 31 and 32.

The weakening apertures generally reduces the width of the terminal by about one half. It could be a different shape such as circular and it could instead be in the form of notches cut out of the edges of the terminal leaving a neck portion in the middle half of the original width.

It is arranged for all sizes of capacitors made according to this technique, that the distance x shown in FIG. 11G is common to all capacitors. This enables the capacitors on their lead frames to pass through a common testing station in which the lead frame acts as the common positive terminal and a probe, shown in FIG. 11H and represented schematically by the arrow P connects the capacitor to a testing circuit in which continuity, capacitance, tolerance, etectera are checked. According to the tolerance the capacitor is marked, e.g. ten percent tolerance or twenty percent tolerance, and, as represented in the flow diagram of FIG. 11J is marked at a marking station MARK and the capacitors then proceed, still carried by their lead frame, through a sensing station SENSE at which the marking on the capacitor is sensed and, dependent upon that marking, the capacitors are despatched to either one of two separate paths to be packaged on a roll such as is indicated diagrammatically by 51 and 52, in accordance with their percentage tolerance. These packages are so-called blister packs for use in automatic insertion machines.

Both embodiments described above have the great advantage over previous arrangement of minimising the wasted space between the capacitor body and the extensioin of the encapsulation providing an improved overall volumetric efficiency of about 25%. This is a great help in overall circuit design where packing densities can be significantly increased. The improvement is brought about in the main by edge-wire welding of the anode support stations 5 or 4C to the anode wire so that very little space is taken up by this part and enabling the anode wire to be shorter, and by having a single bend for parts 3 or 3B behind the cathode connection area so that only the minimum thickness of encapsulation material necessary for electrical insulation and mechanical protection, is required. This thickness is generally similar to the thickness at the sides of the capacitor.

We claim:

1. A method of making lead-less solid electrolytic capacitor comprising:
    providing a lead frame of thin metal having, at each location along its length, an anode connection terminal having a bent-up part and connected to the lead frame by at least one neck located intermediate the ends of the terminal, and a cathode connection terminal connected to the lead frame by at least one neck located intermediate the ends of the terminal;
    providing a solid electrolytic capacitor body with an anode wire projecting therefrom and a cathode connection area on the body;
    welding the anode wire to the bent-up part and connecting the cathode connection area to the cathode connection terminal;
    employing a mould having two mould halves brought up against opposite sides of the lead frame defining a moulding cavity around the body and the connection terminals to encapsulate the body, the anode wire and portions of the anode and cathode connection terminal adjacent the body; and
    separating the encapsulated body from the lead frame by severing at least one of the connection webs.

2. A method of making a solid electrolytic leadless capacitor comprising:
    providing a lead frame of thin metal having, at each of a plurality of locations, anode and cathode connection terminals;
    bending up a part of the anode connection terminal to provide a welding edge;
    providing a solid electrolytic capacitor body, the body having a cathode connection area at one end and an anode wire projecting from the opposite end;
    locating the body on the terminals and connecting the cathode connection area to the cathode connection terminal and welding the anode wire to an edge of the bent up part;
    applying a mould to the lead frame to define for each capacitor a mould cavity;
    moulding an insulating material around the capacitor body;
    removing the mould to provide an encapsulated capacitor with surfaces of the terminals exposed; and
    removing the encapsulated capacitors from the lead frame.

3. A method as claimed in claim 2, wherein the mould comprises a lower part applied to the underside of the lead frame and an upper part applied to the top of the lead frame and with the lead frame sandwiched between the two parts.

4. A method as claimed in claim 2, wherein each anode connection terminal has exactly three parallel transverse bends in it.

5. A method as claimed in claim 2, wherein each cathode connection terminal has exactly two transverse bends in it.

6. A solid electrolytic lead-less capacitor comprising:
    a capacitor body having an anode wire projecting therefrom and a cathode connection area on the surface of the body remote from the anode wire;
    a cathode connection terminal of bent metal strip and having one limb thereof connected to the cathode connection area;
    an anode connection terminal of bent metal strip and having a bent-up portion extending transversely in relation to the anode wire and welded directly to the anode wire; and the capacitor body being encapsulated solely in insulating material which has been moulded directly around the capacitor and which has a generally rectangular external configuration, each connection terminal extending over an adjacent end face of the moulded encapsulating material and over part of a common side face of the encapsulating material for making external electrical connections to the capacitor.

* * * * *